United States Patent
Narayan et al.

(10) Patent No.: US 12,423,522 B2
(45) Date of Patent: Sep. 23, 2025

(54) TEXT CLASSIFICATION OF API DOCUMENTATION FOR INFORMING SECURITY POLICY CREATION

(71) Applicant: Palo Alto Networks, Inc., Santa Clara, CA (US)

(72) Inventors: Krishnan Shankar Narayan, San Jose, CA (US); Srikumar Narayan Chari, Cupertino, CA (US); Venkata Ramadurga Prasad Katakam, Sunnyvale, CA (US); Patrick Kar Yin Chang, San Jose, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 332 days.

(21) Appl. No.: 17/816,047

(22) Filed: Jul. 29, 2022

(65) Prior Publication Data
US 2024/0037332 A1 Feb. 1, 2024

(51) Int. Cl.
*G06F 40/279* (2020.01)
*G06F 9/54* (2006.01)
*G06F 21/60* (2013.01)
*G06F 40/205* (2020.01)

(52) U.S. Cl.
CPC .............. *G06F 40/279* (2020.01); *G06F 9/54* (2013.01); *G06F 21/604* (2013.01); *G06F 40/205* (2020.01)

(58) Field of Classification Search
None
See application file for complete search history.

(56) References Cited

U.S. PATENT DOCUMENTS

| | | | |
|---|---|---|---|
| 11,899,786 B2* | 2/2024 | Nguyen | G06F 21/554 |
| 2022/0038490 A1* | 2/2022 | Thakur | H04L 63/1425 |

OTHER PUBLICATIONS

Devlin, et al., "BERT: Pre-training of Deep Bidirectional Transformers for Language Understanding", ArXiv, abs/1810.04805v2, May 24, 2019, 16 pages.
Riaz, et al., "Hidden in Plain Sight: Automatically Identifying Security Requirements from Natural Language Artifacts", 2014 IEEE 22nd International Requirements Engineering Conference (RE), 2014, pp. 183-192.
Sun, et al., "How to Fine-Tune BERT for Text Classification?", ArXiv, abs/1905.05583v3, Feb. 5, 2020, 10 pages.

* cited by examiner

*Primary Examiner* — Quynh H Nguyen
(74) *Attorney, Agent, or Firm* — Gilliam IP PLLC

(57) ABSTRACT

An API response field classification service obtains API documentation published by a vendor and defined security policies and matches the response fields represented in the security policies to their descriptions in the API documentation. The service generates labelled training data that comprise the identified response field descriptions with labels indicating that their corresponding response field is security related. Additional labelled training data for security unrelated response fields comprises descriptions of response fields that are known not to be represented with any security policies. The service trains a text classifier on the labelled training data. The trained text classifier accepts inputs comprising descriptions of unknown response fields and outputs predicted classes indicating whether the corresponding response fields are predicted to be security related. Subsequent creation of security policies can be focused on these response fields predicted to be security related.

20 Claims, 6 Drawing Sheets

TEXT CLASSIFICATION OF API DOCUMENTATION FOR INFORMING SECURITY POLICY CREATION

BACKGROUND

The disclosure generally relates to data processing (e.g., CPC class G06F) and to clustering or classification (e.g., CPC subclass G06F 16/35).

Cloud service providers (CSPs) are providers of cloud computing technology that deliver computing resources in the cloud. With cloud computing, applications and other computing resources traditionally hosted on-premises are delivered by a CSP over the Internet. CSPs offer Anything-as-a-Service (XaaS) solutions, such as Infrastructure-as-a-Service (IaaS), Platform-as-a-Service (PaaS), and Software-as-a-Service (SaaS), which provide cloud-based infrastructure, cloud-based platforms, and cloud-based applications, respectively. A variety of vendors of hardware technology and software technology employ the services of CSPs for hosting technology in the cloud instead of or in addition to on-premises as hardware and software have traditionally been delivered. End users of a CSP, including such vendors of cloud-delivered technology, can interact with the CSP via application programming interfaces (APIs) of the CSP. Cloud APIs provide an interface for managing computing resources or utilizing the services of a CSP. To inform end users of the available functionality of the CSP that can be invoked via the cloud API exposed by the CSP, the CSP provides documentation for the cloud API that indicates functions of the cloud API, the associated request and response parameters, and any corresponding descriptions.

Natural language processing (NLP) is a field dedicated to the study of computer interpretation of natural languages. This can take the form of speech recognition, text classification, and text-to-speech translation, among other examples. For text classification, documents are parsed for string tokens and string tokens are converted to embedded numerical feature vectors. These embeddings that map parsed strings to numerical space preserve semantic similarity between strings in the resulting numerical space. Text documents with similar classifications and/or content may vary with respect to size and format. Bidirectional Encoder Representations from Transformers (BERT), which is based on the transformer deep learning model, is another technique for NLP that employs machine learning. The BERT model is a deep bidirectional model that is able to learn the context in which words appear. This is in contrast to other NLP tools that generate vector representations of text that are not contextual, such as doc2vec and word2vec, as BERT can produce contextualized embeddings.

BRIEF DESCRIPTION OF THE DRAWINGS

Aspects of the disclosure may be better understood by referencing the accompanying drawings.

DESCRIPTION

Figure 1:
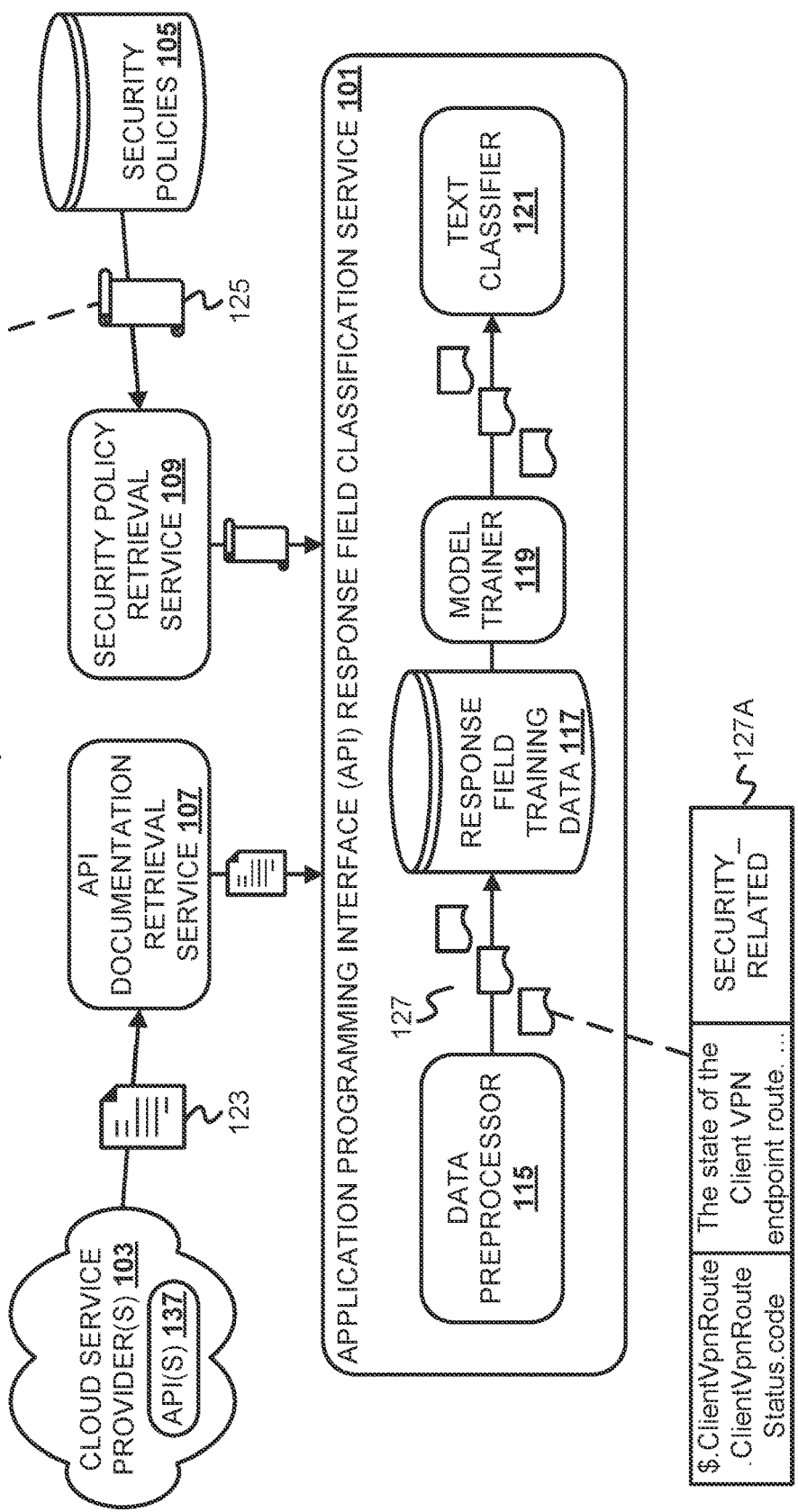
FIG. 1 is a conceptual diagram of training a text classifier to classify API response fields as related or unrelated to security based on their descriptions from API documentation.

The description that follows includes example systems, methods, techniques, and program flows that embody aspects of the disclosure. However, it is understood that this disclosure may be practiced without these specific details. For instance, this disclosure refers to using a BERT model, a doc2vec model, and/or a linear regression model for text classification in illustrative examples. Aspects of this disclosure can be also applied to other machine learning models or combinations thereof that can be trained for NLP and to classify text comprising multiple words. In other instances, well-known instruction instances, protocols, structures and techniques have not been shown in detail in order not to obfuscate the description.

Terminology

This description uses shorthand terms related to cloud technology for efficiency and ease of explanation. When referring to "a cloud," this description is referring to the resources of a CSP. For instance, a cloud can encompass the servers, virtual machines, and storage devices of a cloud service provider. In more general terms, a CSP resource accessible to customers is a resource owned or managed by the CSP entity that is accessible via network connections. Often, the access is in accordance with an API provided by the CSP.

This description uses shorthand terms related to the SaaS delivery model for efficiency and ease of explanation. A "SaaS application" refers to an application hosted in the cloud and made available to end users over the Internet. When referring to a "SaaS application resource," this description is referring to the resources of a vendor of a SaaS application. In general terms, a SaaS application resource accessible to customers is a resource owned or managed by the SaaS application vendor that is accessible via network connections. Often, the access is in accordance with an API provided by the SaaS application vendor.

As used herein, "API response field" and "response field" refer to an element of a response defined for a function of an API that a caller of the function can expect to be returned. A response field has one or more possible values. The possible values of a response field may be enumerated in corresponding API documentation that is published by the provider of the API (e.g., a CSP or SaaS application provider).

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

End users of a CSP or SaaS application can employ a cloud or SaaS security provider to monitor the resources that the CSP or SaaS application vendor has provisioned to them. The security provider can monitor the resources to check for compliance with security policies that have been defined by an end user or by the security provider itself. Since the security provider is external to the CSP or SaaS application vendor (hereinafter simply "the vendor"), the security provider cannot directly access the resources for monitoring and verifying security policy compliance. Instead, security providers generally leverage APIs offered by the vendor to secure an end user's environment. One such technique for API-based security monitoring is achieved by defining security policies that implement checks on values of response fields returned by the vendor in response to API function invocations. These response fields indicated in the security policies have been predetermined to be informative as to whether a corresponding resource is impacted by a misconfiguration or vulnerability based on the values of the response fields that are returned from invocations of the corresponding API functions. Determining which response fields are informative to security to inform security policy creation, however, is a labor intensive process that is conventionally done manually. The majority of response fields do not pertain to security but distinguishing those that are pertinent from those that are not consumes substantial resources of the security provider that are dedicated to security policy creation.

To assist the security policy creation process, text classification techniques for intelligent and automated determination of response fields of a vendor's API that are likely to be pertinent to security monitoring can be leveraged as described herein. An API response field classification service (hereinafter "the service") obtains API documentation published by the vendor and security policies that have been defined for the vendor. The service matches the response fields that are presently represented in at least one of the security policies with their descriptions in the API documentation and generates labelled training data therefrom. Each of the labelled training data comprises a description of a response field from the API documentation and a label indicating that the corresponding response field is informative to resource security. These API response fields can be labelled as informative to resource security because their values are presently checked when verifying compliance with security policies. For labelled training data comprising response fields that are not informative to resource security, the service can utilize response fields that are known not to be associated with any security policy compliance checks and their corresponding descriptions.

The service trains a text classifier, which is a machine learning model or model pipeline employing text classification techniques, on the labelled training data. During training, the text classifier learns to classify descriptions of response fields as corresponding to a response field that is informative or not informative to resource security. The trained text classifier then accepts inputs comprising descriptions of unknown response fields and outputs predicted classes that are indicative of whether the corresponding response fields are predicted to be informative from a security standpoint. Subsequent creation of security policies can thus be focused on the response fields identified as being informative to resource security. Additionally, learning by the text classifier can be ongoing as new security policies are created based on outputs of the trained text classifier and added to the security ecosystem, which creates a feedback loop for continued refinement of the text classifier.

Example Illustrations

FIG. 1 is a conceptual diagram of training a text classifier to classify API response fields as related or unrelated to security based on their descriptions from API documentation. An API response field classification service ("service") 101 guides creation of security policies that specify checks on values of API response fields by using text classification techniques to distinguish response fields that may be related to or informative about security from those that are not. A response field is related to or informative about security if, after a function of an API is called for a resource, a check performed on a value of the response field can provide insight as to whether the resource is impacted by a misconfiguration, vulnerability, or another security issue. FIG. 1 depicts and describes operations by the service 101 to train a text classifier 121. The service 101 can train the text classifier 121 to classify response fields of APIs of by CSPs and/or SaaS application vendors. This example depicts the service 101 training the text classifier 121 based on an API of a CSP 103, though in other examples, the text classifier 121 may be trained on training data generated for multiple vendors (e.g., multiple CSPs) or for a SaaS vendor.

FIG. 1 also depicts an API documentation retrieval service 107 and a security policy retrieval service 109 ("the retrieval service 107" and "the retrieval service 109," respectively). Each of the retrieval services 107, 109 can be implemented as part of the service 101 or an agent deployed externally with which the service 101 can communicate. The retrieval service 107 retrieves API documentation 123 published by the CSP 103. The API documentation 123 is published by the CSP 103 and comprises documentation of one or more APIs 137 of the CSP 103. The API documentation 123 includes an enumeration of the functions of the API 137 and, for each function, the API request and response format. For instance, if the CSP 103 offers a plurality of services that each have an API, the API documentation 123 comprises documentation of the APIs of the plurality of services. The API documentation 123 is offered as one or more files, such as a JavaScript Object Notation (JSON) file(s) or a YAML file(s), and may be formatted according to the OpenAPI Specification JavaScript Object Notation (JSON) file(s) or a YAML Ain't Markup Language (YAML) file(s). To retrieve the API documentation 123 from the CSP 103, the retrieval service 107 may crawl web pages of the CSP 103 to retrieve the file(s) of the API documentation 123 and/or request the API documentation 123 from the CSP 103, such as through invoking one or more functions of the API 137 for specification retrieval or via one or more Uniform Resource Locators (URLs) by which the API documentation 123 is accessible.

The retrieval service 109 retrieves security policies 125 from a repository 105 of security policies maintained by the security vendor that provides the service 101. The security policies 125 have been defined by or for a customer (e.g., an end user or group of end users of the vendor that utilizes the security vendor and service 101 for resource security). In implementations where the retrieval service 109 is implemented as an agent deployed to the repository, the retrieval service 109 may search the repository 105 for security policies and communicate identified security policies to the service 101. As updates are made to the repository 105, including insertions of new security policies and/or updates to existing security policies, the retrieval service 109 can communicate the updates to the service 101 as they are made. The retrieval service 109 may be configured to ignore security policies that are unchanged or have already been reported to the service 101. As another example, the service 101 can initially poll the retrieval service 109 for security policies (e.g., following boot of the retrieval service 109) and periodically poll the retrieval service 109 for new security policies and/or updates to existing security policies. In the case in which the retrieval service 109 is incorporated part of the service 101, the retrieval service 109 can query the repository 105 for the security policies 125. The retrieval service 109 may periodically query the repository 105 for updates and/or new security policies.

The security policies 125 can be implemented with rules that specify checks on one or more values of response fields that are returned as a result of invocations of functions of the API 137. A response field returned from an API function invocation is considered to be informative to resource security if its value(s) that is checked can provide insight into whether a resource is secure and configured correctly or is impacted by a misconfiguration or vulnerability. To illustrate, consider an exemplary one of the security policies 125 defined for an Amazon Web Services® (AWS) cloud, depicted in FIG. 1 as security policy 125A. The security policy 125A is implemented with a rule specifying a check for the value of the "code" response field in a "ClientVPN-RouteStatus" object returned from calls to the API function "DescribeClientVpnRoutes":

config from cloud.resource where cloud.type='aws' AND api.name='aws-ec2-describe-client-VPN-routes' AND json.rule="ClientVPNRoute.ClientVPNRouteStatus. code='failed'"

Because this security policy specifies a check for the "code" response field, this response field is treated as being related to resource security (specifically for AWS resources provisioned to customers).

The service 101 generates a set of training data for training the text classifier 121 based on matching the response fields represented it the security policies 125 with their corresponding descriptions in the API documentation 123. The service 101 comprises a data preprocessor 115 that preprocesses data obtained by the service 101, including the API documentation 123 and security policies 125, to prepare inputs to the text classifier 121. The data preprocessor 115 parses the API documentation 123 and/or the security policies 125 if either are not obtained in a format that is parsed. The data preprocessor 115 parses the API documentation 123 to make individual fields of the API documentation 123 accessible. As an example, if the API documentation 123 comprises a JSON file(s), the data preprocessor 115 can parse the JSON structured data included therein to create a JavaScript object(s). The data preprocessor 115 can also parse the security policies 125 so that each individual security policy can be processed.

Once the API documentation 123 and security policies 125 are in a format that can be manipulated by the service 101, the data preprocessor 115 generates labelled training data 127 therefrom. To do so, the data preprocessor 115 determines the response fields of the API 137 that are represented in at least a first of the security policies 125 and are thus security related. The data preprocessor 115 can determine the response fields of the API 137 that are represented in the security policies 125 based on a known format of the security policies 125. For instance, referring to the above example, the data preprocessor 115 can parse and/or search each of the security policies 125 to identify the API name and the first term in the JSON rule, which indicates the response field being checked. Parsing the example security policy given above to identify the API name and first term in the JSON rule yields a determination by the data preprocessor 115 that the response field name "code" that corresponds to the API 137 function named "DescribeClientVpnRoutes" is represented in the security policy.

For each response field of the API 137 that the data preprocessor 115 determines to be represented in the security policies 125, the data preprocessor 115 extracts (e.g., copies) the description associated with the response field name from the API documentation 123 (or the parsed representation of the API documentation 123). The data preprocessor 115 can insert the extracted description into a data structure, a file, etc. For instance, the data preprocessor 115 can search/query the API documentation 123 or its parsed representation to identify the data (e.g., the JavaScript field(s)) corresponding to the response field name and extracts the description from the determined data. Determining the description to extract can be dependent upon the format of the API documentation 123 used by the vendor. For example, in implementations where the API documentation 123 is represented with JSON structured data that are parsed to create a JavaScript object(s), the data preprocessor 115 can determine a JavaScript object(s) that corresponds to the function and determine the description of the response field based on a property of the JavaScript object(s) having the description as a value. With respect to the previous example, the data preprocessor 115 determines that the "code" response field is represented in one of the security policies 125 extracts from the API documentation 123 the description of the "code" response field that is associated with the function named "DescribeClientVpnRoutes" in the API documentation 123.

The data preprocessor 115 generates training data 127 based on extracting the response field descriptions from the API documentation 123. For each extracted description, the data preprocessor 115 generates a corresponding one of the training data 127 by associating a label with the description indicating that the description corresponds to a security related response field. The data preprocessor 115 labels the corresponding entry or field of the data structure, file, etc. in which the description was inserted. This example refers to the data preprocessor 115 as labelling response fields and descriptions to generate the training data 127. In other examples, another component or entity (e.g., of the service 101) can attach labels to response fields and their corresponding descriptions to generate the training data 127. To maintain the correspondence between the name of the response field and its description during processing by the text classifier 121, the data preprocessor 115 also can associate the response field name with the labelled description (e.g., as metadata that is not input to the text classifier 121).

To illustrate, FIG. 1 depicts a first of the training data 127 in additional detail, represented as training data 127A, that corresponds to the security policy 125A. The training data 127A comprises a labelled input generated based on identification of the "code" response field in the security policy 125A. The training data 127A comprises metadata (e.g., a label, tag, etc.) indicating the name of the "code" response field, text of the description of the "code" response field extracted from the API documentation 123, and a label indicating that the "code" response field is related to resource security.

The training data 127 that are generated also comprise labelled descriptions of response fields of the API 137 that are not security related. A response field is considered not to be related to security if it does not provide any insight into resource security at least based on lack of inclusion in the security policies 125. For instance, response fields that are not related to resource security may be those corresponding to a function that is represented in the security policies 125 by one or more—but not all—of its response fields, such as the response fields for the "DescribeClientVpnRoutes" function excluding "code" and any other response fields that may be represented in at least another of the security policies 125. In this case, based on a determination that a function of the API 137 has at least a first response field represented in the security policies 125, the service 101 may determine others of the response fields of the API function that are not represented in any of the security policies 125 and generate labelled training data based on those response fields. The data preprocessor 115 can generate labelled training data comprising the descriptions of the response fields determined not to be related to resource security in a similar manner as that described above for generating the subset of the labelled training data 127 that corresponds to the security related response fields.

The data preprocessor 115 inserts the training data 127 into a repository 117 of training data. The repository 117 is depicted as being maintained by the service 101 in this example but may be maintained external to the service 101 in implementations (e.g., maintained on a separate physical/virtual instance that is accessible to the service 101). Building of the repository 117 can be ongoing as new security policies are created, documented in the repository 105, and retrieved from the repository 105 by the retrieval service 109.

A model trainer 119 of the service 101 trains the text classifier 121 on training data retrieved from the repository 117. The text classifier 121 is a machine learning model or a machine learning model pipeline/ensemble (i.e., a combination or sequence of models) that can be trained to classify multi-word text provided as input. For example, the text classifier 121 can comprise a BERT model. The BERT model of which the text classifier 121 is comprised may be pretrained and fine-tuned during training by the model trainer 119. As an example of a model pipeline/ensemble that forms the text classifier 121, the text classifier 121 can comprise a doc2vec model and a logistic regression classifier. In this case, inputs to the text classifier 121 are received by the doc2vec model, outputs of the doc2vec model are passed to the logistic regression classifier for input, and the prediction output by the logistic regression classifier is the output of the text classifier 121. The model trainer 119 can train the doc2vec model and logistic regression classifier in tandem. In such implementations, training the text classifier 121 refers to training the doc2vec model and logistic regression classifier in tandem. As another example, a pretrained doc2vec model (e.g., available off-the-shelf/as an open source library) can be employed such that the model trainer 119 provides the training data retrieved from the repository 117 to the doc2vec model for generating embeddings that it then passes to the logistic regression classifier for training, with the labels associated with the retrieved training data maintained for evaluation of the logistic regression classifier's predictions. In other words, the pretrained doc2vec model further processes the labelled training data retrieved from the repository 117 to generate corresponding document embeddings having the same associated labels that are ultimately used for training of the logistic regression classifier. In these examples, training the text classifier 121 refers to training the logistic regression classifier based on document embeddings generated by the doc2vec model and the labels from corresponding training data. As another example, the text classifier 121 can be a classifier that is trained for sentiment analysis using bag-of-words, such as a bag of-words model that generates vectors from the training data retrieved from the repository 117 for input into a classifier. Implementations of the text classifier 121 that comprise a bag-of-words model and a classifier can be trained similar to the doc2vec model and logistic regression classifier (i.e., in tandem or using a pre-trained, off-the-shelf bag-of-words model for training a classifier).

The model trainer 119 inputs the retrieved, labelled training data into an input layer of the text classifier 121 and tunes hyperparameters of the text classifier 121 based on evaluation of its outputs (i.e., predicted classes) against the labels of the inputs. When providing input to the text classifier 121, the model trainer 119 can omit the response field names from the provided inputs and, as outputs are obtained from the text classifier 121, indicate the response field name with each output to aid in evaluating performance of the text classifier 121. During training, the text classifier 121 learns to classify descriptions of response fields extracted from published API documentation as corresponding to a security related or unrelated response field. The model trainer 119 terminates training of the text classifier 121 when a training termination criterion has been satisfied (e.g., after a designated number of epochs, when the error satisfies a designated threshold, etc.).

Figure 2:
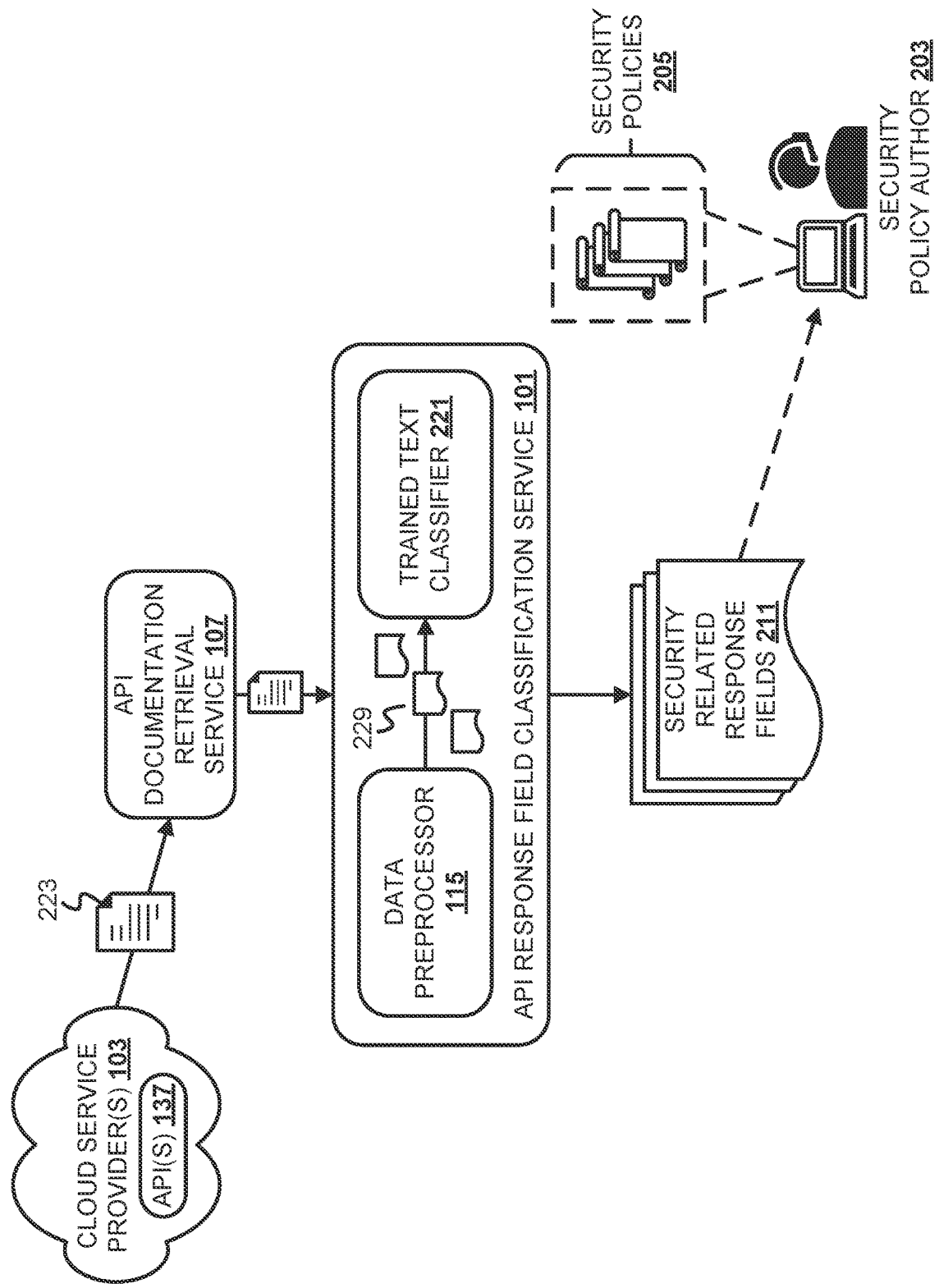
FIG. 2 is a conceptual diagram of using a trained text classifier for determining security related response fields to inform security policy creation.

FIG. 2 is a conceptual diagram of using a trained text classifier for determining security related response fields to inform security policy creation. A trained text classifier 221 is the text classifier 121 resulting from training as described in reference to FIG. 1 (e.g., a trained BERT model). The trained text classifier 221 accepts text descriptions of response fields as inputs and outputs classifications indicating whether the response field corresponding to the input description is predicted to be security related.

The retrieval service 107 retrieves API documentation 223 from the CSP 103. The API documentation 223 comprises documentation of one or more functions of the API 137 that have been added, updated, or otherwise modified and are thus unknown with respect to whether the associated response fields are security related. The data preprocessor 115 parses the API documentation 223, extracts the names and descriptions of the unknown response fields, and generates inputs 229 to the trained text classifier 221 therefrom. Each of the inputs 229 comprises a text description of a response field extracted from the API documentation 223 and an indication of the name of the corresponding response field (e.g., stored as metadata). Since there is no matching of response fields indicated in security policies with their descriptions in API documentation during post-training operations, the data preprocessor 115 can determine the response field names and descriptions based on a known format of the API documentation 223 (e.g., based on property names contained therein).

The service 101 provides the inputs 229 to an input layer of the trained text classifier 221. For each of the inputs 229 and indicated description, the trained text classifier 221 classifies the description as corresponding to a response field that is either security related or unrelated and produces an output indicative of such. Outputs generated by the trained text classifier 221 may be outputs of a trained BERT model, a trained model pipeline/ensemble comprising a trained doc2vec model and trained logistic regression classifier (where the doc2vec model may or may not be pretrained as described above), or another trained text classifier. As the trained text classifier 221 generates outputs, the service 101 evaluates the outputs to identify those indicating that the corresponding response field is predicted to be security related. Response fields 211 that the trained text classifier 221 has predicted to be security related based on their descriptions are identified (e.g., based on the metadata of the corresponding one of the inputs 229) and indicated. Indicating the response fields 211 can include generating a report or notification that comprises names of the response fields 211, storing names of the response fields (e.g., in the generated report) in data storage, etc.

In some examples, indicating the response fields 211 predicted to be related to security includes designating the response fields 211 for security policy creation. A security policy author 203 creates one or more security policies 205 that specify checks on values of the response fields 211 for security issue detection. Resources dedicated to security policy creation, such as time and labor of the security policy author 203, can thus be focused on authorship of new security policies for the identified security related response fields. Resources thus are not consumed by research/experimentation performed to determine which response fields of the API documentation 223 are security related and should thus be targeted by security policy creation in addition to the security policy creation itself.

Figure 3:
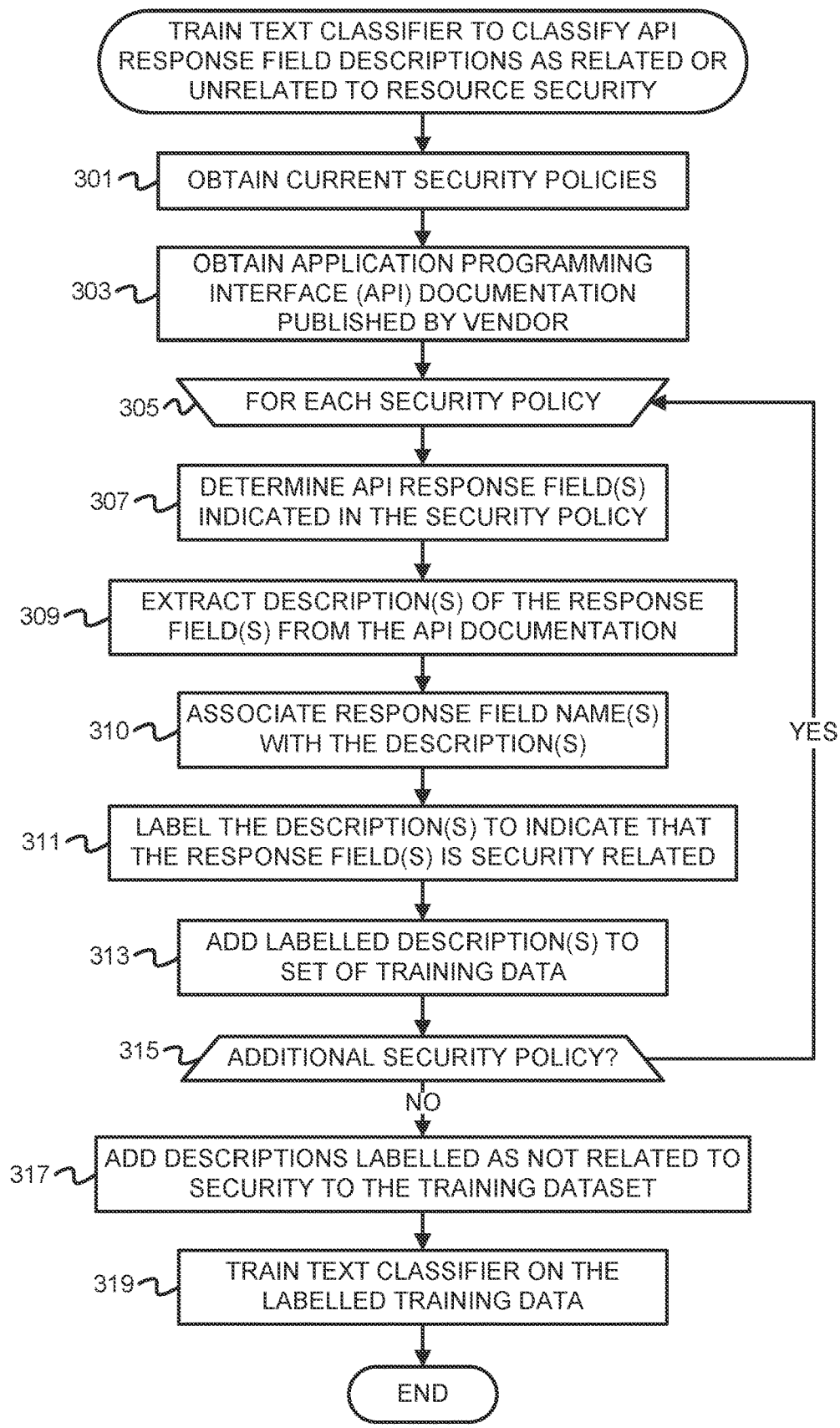
FIG. 3 is a flowchart of example operations for training a text classifier to classify response fields as related or unrelated to security based on their text descriptions.
Figure 4:
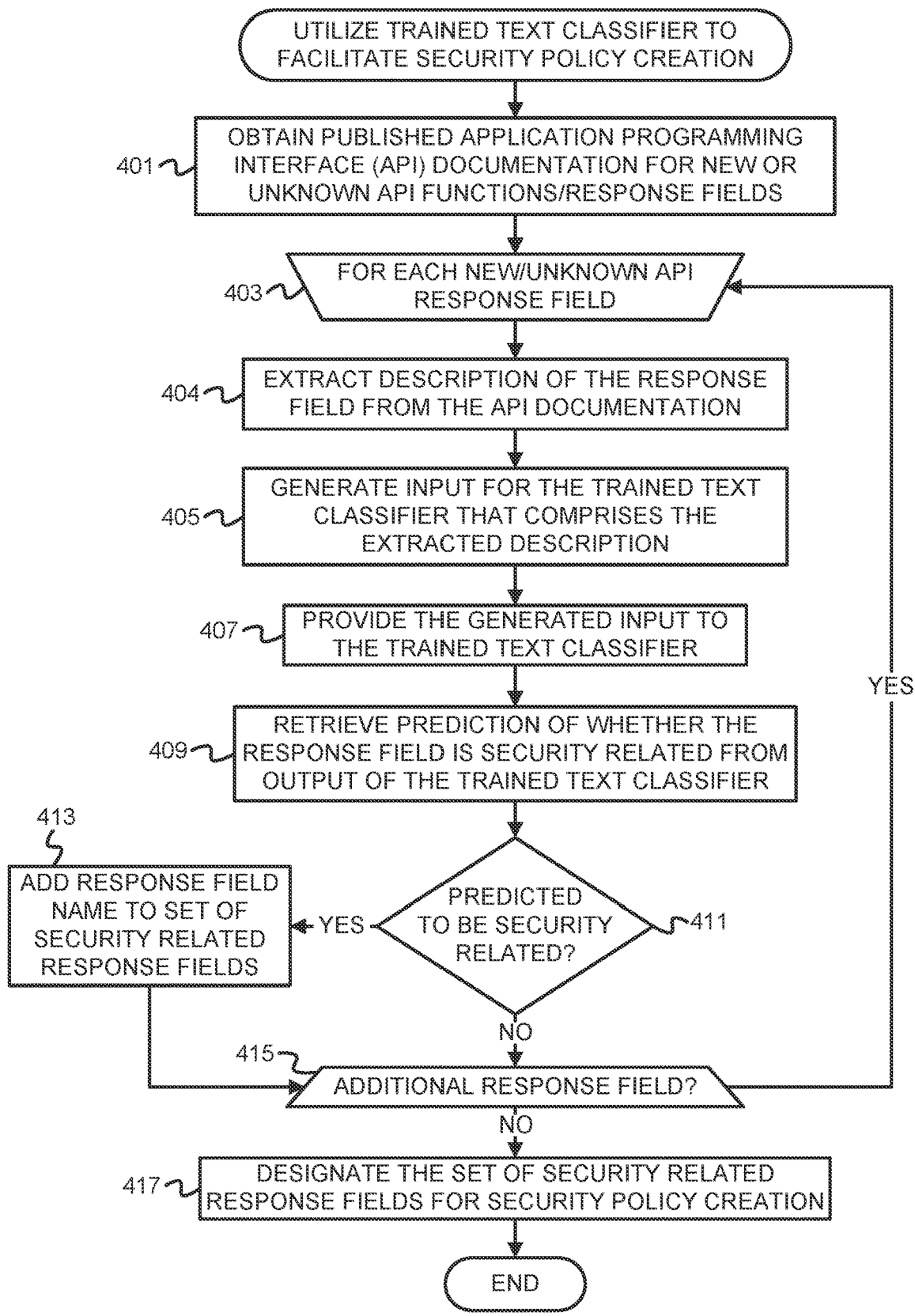
FIG. 4 is a flowchart of example operations for utilizing a trained text classifier to facilitate creation of security policies.
Figure 5:
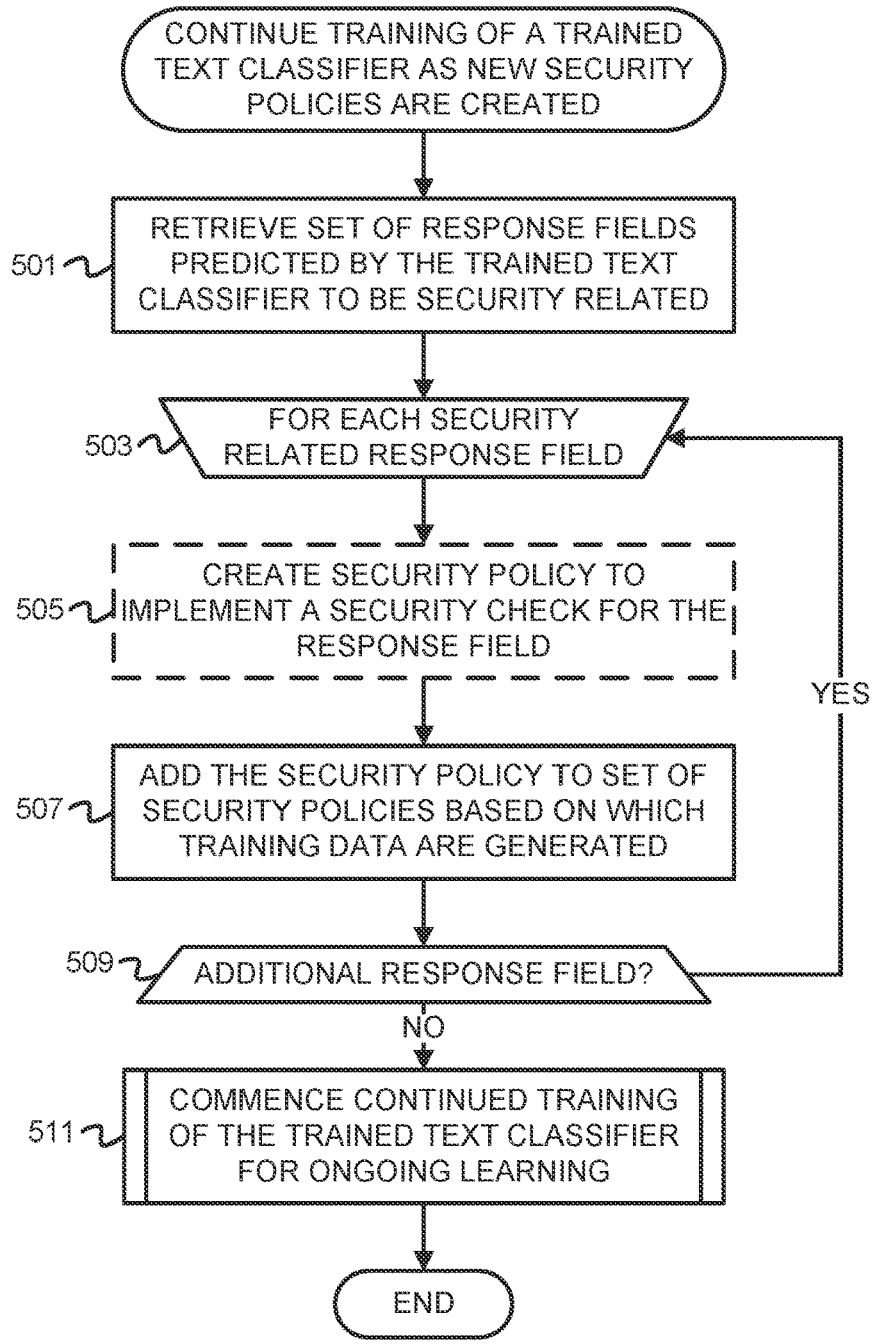
FIG. 5 is a flowchart of example operations for continuing training of a trained text classifier as new security policies are created.

FIGS. 3-5 are flowcharts of example operations for using text classification of API documentation to inform creation of security policies. The example operations are described with reference to an API response field classification service (hereinafter "the service") for consistency with the earlier figures. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 3 is a flowchart of example operations for training a text classifier to classify response fields as related or unrelated to security based on their text descriptions. The example operations assume that security policies have been defined for securing resources of a vendor that have been provisioned or allocated to a customer. Each security policy is implemented with a check performed on a value(s) of a response field(s) that is defined for a function(s) of the vendor's API and returned as a response to invocations of the function(s). For instance, each security policy may be implemented as comprising a rule for at least a first value of a corresponding field of an API response that is returned in response to an API function invocation, where conformance of the value of the response field with the rule determines whether a security issue is identified.

At block 301, the service obtains current security policies. The security policies are those maintained by security components/entities that monitor resources of a vendor that are provisioned to a customer. The security policies may be those defined by and/or for the customer or across multiple customers, such as the security policies of customers of the same vendor (e.g., the same CSP). The service retrieves the file(s) and/or data structure(s) that comprises the security policies from a data store(s) of the vendor (e.g., via the vendor's API).

At block 303, the service obtains API documentation published by the vendor. The API documentation comprises one or more files with documentation of the vendor's API, including functions of the API and, for each function, a request format for invoking the function and a format of a response to the function invocation. The service can obtain the API documentation via invoking a function(s) of the API, by downloading the API documentation from the vendor, from a location in storage into which the API documentation has been downloaded, etc. For some vendors, each of the services offered by the vendor has its own API and thus its own corresponding API documentation. In these cases, the service obtains the API documentation that is published for each vendor service. "The API documentation" thus refers to the collective API documentation for each vendor service. If not already in a parsed format (e.g., a JavaScript object(s) created from parsing a JSON file(s)), the service parses the API documentation that is obtained.

At block 305, the service begins iterating through each of the security policies. If the security policies are obtained in a format in which the security policies are not individually accessible (e.g., a text file(s)), the service can first parse the security policies.

At block 307, the service determines at least a first API response field that is indicated in the security policy. Security policies can be implemented as rules for structured data that represents resources of the vendor, such as rules for JSON structured data. The rules can have one or more terms, where at least one of the terms corresponds to a response field that should be evaluated for the presence of a certain value(s). The service can determine the term that corresponds to the response field based on a predefined format or structure of the rule. For instance, the service may be preconfigured with a property or field name that corresponds to the response field being checked with the rule. In such cases, the service determines the value of the property or field name corresponding to the response field name. For vendors that have multiple APIs for multiple corresponding services, the service also can determine the vendor service to which the response field corresponds based on a name, identifier, etc. of the vendor service indicated in the security policy.

At block 309, the service extracts a description of the response field from the API documentation. The service matches the response field to its description in the API documentation based on the name of the response field that is included in both the security policy and the API documentation and extracts the description. Response field names may be enumerated in the API documentation as properties/fields having the corresponding response field descriptions as values. If the vendor provides separate API documentation across the vendor's services, the service determines the API documentation corresponding to the vendor service based on the name of the vendor service identified from the security policy. Extracting the description can be implemented through copying the value of a description property or field associated with the response field name into a data structure, writing the text of the description to a file, etc. In some instances, response fields may be "nested" in the API documentation, such as when an API invocation returns a data structure or vendor-defined object that stores multiple values. If the response field is a value of such a data structure or vendor-defined object, the service determines the description of the value that is contained within the description of its corresponding data structure/object or from elsewhere in the API documentation.

At block 310, the service associates the name of the response field with its description. The service associates the name of the response field with the description so that the name can be maintained in association with the description without being processed during training. For instance, the service can add the response field name to the description as metadata, as a label or tag, etc.

At block 311, the service labels the description to indicate that the response field is related to security. The label can be a text label, a Boolean label (e.g., TRUE or 1), or any other label representation that has been predefined to indicate that the labeled description is informative or pertinent to resource security. The service may label the description by writing the label to an entry in the file to which the description was written (e.g., in another column in a same row) or otherwise associating the description with the description (e.g., as a label or tag).

At block 313, the service adds the labelled description to a set of training data. The set of labelled training data may be stored in a repository or other data store from which training data are retrieved for training a text classifier.

At block 315, the service determines if an additional security policy is remaining. If another security policy is remaining, operations continue at block 305. Otherwise, operations continue at block 317.

At block 317, the service adds descriptions labelled as not related to security to the training dataset. The labels indicating that the corresponding descriptions belong to a class of response fields that are not related to security may be textual descriptions, Boolean values (e.g., 0 or FALSE), or another class that can be differentiated from the labels assigned to descriptions of security-related response fields. The descriptions that are not related to security with the corresponding labels and associated response field names may have been previously determined and provided to the service as input or downloaded by the service. As another example, the service may determine the descriptions to label as not related to security by determining, for a function of the API having a security-related response field, the other response fields corresponding to the function that are not represented in a security policy. To illustrate, if a function of the API has defined response fields A, B, and C defined but only response field B is represented in a security policy, the service can determine that response fields A and C are not security related. For each of the response fields determined not to be security related, the service matches those response fields to their descriptions in the API documentation, extracts the descriptions, and labels the descriptions accordingly as similarly described above.

At block 319, the service trains a text classifier on the labelled training data. The text classifier comprises a machine learning model or model pipeline/ensemble that can be trained to classify text and accepts multi-word text as inputs and outputs a prediction of a class of the input text. The text classifier should accept multi-word text as inputs because the text classifier learns to classify descriptions of response fields as related or not related to security (e.g., based on contextual information across the input descriptions) in contrast to other models for NLP that classify single words. For instance, the text classifier trained by the service can be BERT model. The BERT model may be pretrained and retrieved for fine-tuning through further training by the service with the labelled training data. If the text classifier comprises a model pipeline/ensemble, the text classifier may comprise a first model that performs NLP tasks and a classifier that accepts outputs of the first model as inputs. For example, the text classifier can comprise a doc2vec model and a logistic regression classifier, where the service inputs the labelled training data to the doc2vec model and passes the document embeddings output by the doc2vec model to the logistic regression classifier for classification. As another example, the text classifier can comprise a bag-of-words model and a classifier for sentiment analysis. The service can train the models of which the model pipeline/ensemble is comprised (e.g., the doc2vec model and logistic regression classifier) in tandem. In other examples, the service can employ a model that has been pretrained to perform NLP tasks and is available off-the-shelf (e.g., a pretrained doc2vec model) and train the classifier on labelled outputs of the pretrained model. For instance, if using a pretrained doc2vec model and a logistic regression classifier, the service can input the training data to the doc2vec model for generation of a document embedding that is input to the logistic regression classifier, where evaluation of predictions based on the labels associated with the training data is deferred until after outputs of the logistic regression classifier are obtained. The service computes loss/error and tunes weights or other hyperparameters of the logistic regression classifier based on the evaluation of its predictions such that the logistic regression classifier but not the doc2vec model is trained at this stage.

Before beginning training, the service can split the labelled training data into training, testing, and validation sets, where training the text classifier includes performing testing and validation using the respective sets of the labelled training data. The service trains the text classifier until a training termination criterion has been satisfied (e.g., completion of a designated number of epochs, satisfaction of an error rate threshold, etc.) and the text classifier is considered to be a trained text classifier. Once training has terminated, the trained text classifier will have learned to classify text descriptions of response fields as corresponding to a response field that is informative or uninformative to security.

FIG. 4 is a flowchart of example operations for utilizing a trained text classifier to facilitate creation of security policies. The example operations refer to the trained text classifier that has been trained on descriptions of response fields that are each labelled as related or pertinent to security or not related or pertinent to security (e.g., as described in reference to FIG. 3). The trained text classifier may be, for example, a trained BERT model, a trained model pipeline comprising a trained natural language processor and trained classifier (e.g., a trained doc2vec model and logistic regression classifier or trained bag-of-words model and trained classifier), etc.

At block 401, the service obtains published API documentation of a vendor for new and/or unknown API functions and/or response fields. The vendor may have updated existing API functions to include new response fields or developed new functionality that can be invoked through a new function(s) of the API, such as by developing a new service. The service may have subscribed to updates to a repository in which the vendor stores its API documentation or have an agent deployed to the repository that has been preconfigured to monitor the repository for updates and communicate the updates to the service. In either case, on insertion of documentation for a new API function or update to documentation of an existing API function, the service obtains the corresponding API documentation. If not already in a parsed format, the service can parse the obtained documentation (e.g., by creating a JavaScript object(s) corresponding to documentation comprising JSON structured data).

At block 403, the service begins processing each new or unknown response field for which API documentation was obtained. For instance, the service can begin processing each entry or field of a data structure resulting from parsing the API documentation. Which of the entries or fields the service identifies as corresponding to a response field may be dependent on the structure or format of the API documentation. For instance, if the API documentation is represented as a JavaScript object(s), the service can determine the name of each response field based on a path by which the corresponding property value can be retrieved (e.g., using dot notation).

At block 404, the service extracts a description of the response field from the API documentation. The service extracts the description as similarly described above in reference to FIG. 3, such as by copying the description identified in the API documentation into another data structure.

At block 405, the service generates an input for the trained text classifier that comprises the extracted description. The generated input should have the same format as the inputs used for training the trained text classifier (but unlabeled). The service can also associate the response field name identified in the API documentation with the generated input (e.g., as metadata, as a label, a tag, etc.).

At block 407, the service provides the generated input to the trained text classifier. Depending on the architecture of the trained text classifier, the service can provide the generated input to an input layer of the trained text classifier or another model/entity that performs additional processing of the response field description included in the input, such as tokenization. The service may store the response field name in a variable or data structure by which the response fields corresponding to input descriptions can be tracked (e.g., a variable storing a name of the response field corresponding to the currently input description).

At block 409, the service retrieves a prediction of whether the response field is security related from output of the trained text classifier. The output indicates one of two classes that indicate whether the description of the response field is predicted to be related to or informative about security.

At block 411, the service determines based on the output if the response field is predicted to be informative to resource security. If the output indicates that the response field is predicted to be informative to resource security, operations continue at block 413. Otherwise, operations continue at block 415.

At block 413, the service adds the response field name to a set of security related response fields. The service determines the name of the response field based on metadata, a label, tag, etc. that were associated with the description corresponding to the input. If the response field name was stored in a variable or data structure before inputting the description to the classifier, the service determines the name of the response field based on the value stored in the variable or data structure. The set of security related response fields can be stored in a data structure(s) or file to which the service writes the response field names and optionally the corresponding descriptions.

At block 415, the service determines if an additional response field that is new or unknown is remaining. If an additional response field is remaining, operations continue at block 403. Otherwise, operations continue at block 417.

At block 417, the service designates the set of security related response fields for security policy creation. Designating the set of security related response fields for security policy creation can include generating a report or notification indicating the set of response fields, outputting the names of the response fields in the set, storing the set of security related response fields in a database or repository, etc. Security policies can subsequently be created that implement checks on values of the API response fields to be performed during security policy evaluations for resources of the vendor.

FIG. 5 is a flowchart of example operations for continuing training of a trained text classifier as new security policies are created. Continuing training of the trained text classifier supports ongoing learning. The example operations assume that one or more machine learning models have already been trained to generate a trained text classifier as described above. The trained text classifier comprises a trained model or model pipeline that has been trained to classify text having multiple words. Examples include a trained BERT model or a trained model pipeline comprising a trained natural language processor (e.g., a doc2vec model) that passes outputs to a trained logistic regression classifier.

At block 501, the service retrieves a set of response fields predicted by the trained text classifier to be security related. The service retrieves the set of response fields from output of the trained text classifier. The service may also retrieve the descriptions corresponding to the set of response fields based on which the trained text classifier generated the predictions.

At block 503, processing of each response field predicted to be security related begins. This example depicts the operations performed for each security related response field, though in other examples, the security related response fields may be indicated as a set so that the depicted operations can be performed in parallel or concurrently.

At block 505, a security policy that implements a security check for the response field is created. Block 505 is depicted with dashed lines because security policy creation may be at least partially performed by the service or may be performed offline. For instance, the service may indicate that a security policy should be created for evaluating values of the response field, after which security policy authors, researchers, and/or other entities can determine which possible value(s) of that response field may indicate a security issue. As another example, the service may select a suggested or recommended value(s) among the possible values of the response field that may be indicative of a security issue. The suggestion or recommendation may be selected based on heuristics or other guidance with which the service has been preconfigured, such as a set of terms of values that are commonly indicative of security issues based on previous research and existing security policies.

At block 507, the service adds the security policy to the set of security policies based on which training data are generated. The service may add the security policy to a security policy repository such as that referenced in block 301 of FIG. 3 or another data store that stores security policies created based on outputs of the trained text classifier and that are used for training data generation.

At block 509, operations continue depending on whether there is an additional security related response field. If there is an additional security related response field, operations continue at block 503. Otherwise, operations continue at block 511.

At block 511, the service commences continued training of the trained text classifier for ongoing learning of the trained text classifier. Continued training leverages the security policies created based on the outputs of the trained text classifier for generation of additional training data. Training for ongoing learning can proceed as similarly described in reference to FIG. 3, where the security policies obtained as described at block 301 comprise the newly-created security policies (i.e., those created at block 505).

Variations

The Figures depict a text classifier that is trained on labelled descriptions corresponding to an API of a vendor, which may be a CSP or a SaaS application provider. In implementations, one text classifier can be trained on training data generated from API documentation and security policies corresponding to multiple vendors, or multiple text classifiers can be trained on training data generated from API documentation and security policies of different respective vendors. For instance, text classifiers may be trained for each vendor to be supported such that there is a one-to-one mapping between trained text classifiers and vendors. As an alternative, one text classifier may be trained on training data corresponding to the set of supported vendors (i.e., across CSPs and SaaS application providers). As yet another example, one text classifier may be trained on training data corresponding to CSPs, and another may be trained on training data corresponding to SaaS application providers. In this case, during deployment when the text classifiers have been trained, a new or unknown response field is fed into a pipeline corresponding to the type of its vendor (i.e., CSP or SaaS application provider).

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, with respect to FIG. 5, while the example operations are depicted as sequential, processing of the set of security related response fields can be asynchronous as security policy authors create security policies based on the security related response fields. Additionally, processing of multiple of the set of security related response fields can be concurrent, such as based on creation of a security policy that implements security checks on two or more of the response fields. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain, or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical, etc.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 6:
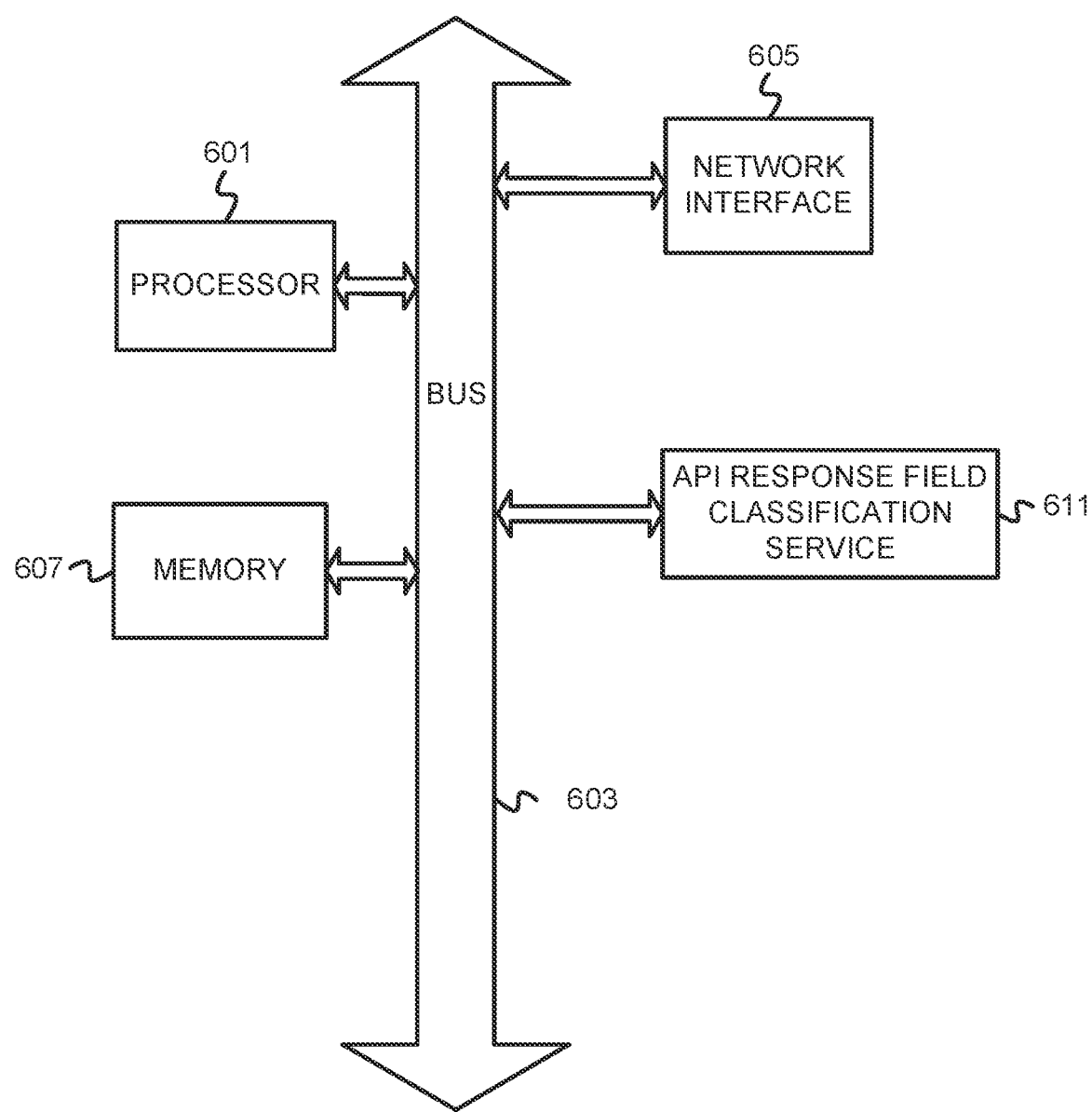
FIG. 6 depicts an example computer system with an API response field classification service.

FIG. 6 depicts an example computer system with an API response field classification service. The computer system includes a processor 601 (possibly including multiple processors, multiple cores, multiple nodes, and/or implementing multi-threading, etc.). The computer system includes memory 607. The memory 607 may be system memory or any one or more of the above already described possible realizations of machine-readable media. The computer system also includes a bus 603 and a network interface 605. The system also includes API response field classification service 611. The API response field classification service 611 trains a model(s) to classify API response fields as related to or not related to resource security based on descriptions of the API response fields extracted from published API documentation. The API response field classification service 611 also leverages the trained model(s) to classify API response fields based on their associated descriptions from API documentation so that those that are informative to resource security can be identified to the entity(ies) responsible for security policy creation. Any one of the previously described functionalities may be partially (or entirely) implemented in hardware and/or on the processor 601. For example, the functionality may be implemented with an application specific integrated circuit, in logic implemented in the processor 601, in a co-processor on a peripheral device or card, etc. Further, realizations may include fewer or additional components not illustrated in FIG. 6 (e.g., video cards, audio cards, additional network interfaces, peripheral devices, etc.). The processor 601 and the network interface 605 are coupled to the bus 603. Although illustrated as being coupled to the bus 603, the memory 607 may be coupled to the processor 601.

While the aspects of the disclosure are described with reference to various implementations and exploitations, it will be understood that these aspects are illustrative and that the scope of the claims is not limited to them. In general, techniques for facilitating creation of security policies for detection of misconfigured and/or vulnerable resources through classification of API response fields based on their descriptions extracted from published API documentation as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

The invention claimed is:

1. A method comprising:
    parsing application programming interface (API) documentation of an API published by a vendor to generate parsed API documentation, wherein the API documentation defines format of a plurality of API responses for functions of an API of the vendor, wherein the plurality of API responses comprises corresponding ones of a plurality of response fields indicated in the API documentation;
    determining a first subset of the plurality of response fields that are related to security and a second subset of the plurality of response fields that are not related to security based on determining which of the plurality of response fields are indicated in security policies enforced for resources of the vendor;
    extracting, from the parsed API documentation, first descriptions corresponding to the first subset of response fields and second descriptions corresponding to the second subset of response fields;
    generating a set of training data from the first and second subsets of response fields and the corresponding first and second descriptions based on labelling each of the first descriptions as related to security and labelling each of the second descriptions as not related to security; and
    training, on the set of training data, a text classifier to classify response fields of new or unknown API functions as related to security or not related to security based on response field descriptions provided as input.

2. The method of claim 1, wherein extracting the first descriptions from the parsed API documentation comprises, for each response field of the first subset of response fields,
    matching the response field to its description in the parsed API documentation; and
    extracting the description from the parsed API documentation,
    wherein labelling each of the first descriptions as related to security comprises labelling the description extracted from the parsed API documentation as related to security.

3. The method of claim 1, wherein determining the first subset of response fields that are related to security comprises parsing the security policies to generate parsed security policies and identifying the first subset of response fields from the parsed security policies.

4. The method of claim 1, wherein determining the second subset of response fields comprises determining that the second subset of response fields are not represented in the security policies.

5. The method of claim 1, wherein extracting the second descriptions from the parsed API documentation comprises, for each response field in the second subset of response fields,
    matching the response field to its description in the parsed API documentation; and
    extracting the description from the parsed API documentation,
    wherein labelling each of the second descriptions as not related to security comprises labelling the description extracted from the parsed API documentation as not related to security.

6. The method of claim 1, wherein the text classifier comprises a Bidirectional Encoder Representations from Transformers (BERT) model.

7. The method of claim 1, wherein the text classifier is a machine learning model pipeline comprising a natural language processor and a classifier.

8. The method of claim 1 further comprising predicting whether a first response field is related to security, wherein predicting whether the first response field is related to security comprises,
    inputting a first description for the first response field into the text classifier that has been trained, wherein the first description was not used as input for training the text classifier and corresponds to a new or unknown API function; and
    receiving, from output of the text classifier that has been trained, a class indicating whether the first response field corresponding to the first description is predicted to be related to security.

9. The method of claim 8 further comprising, based on the class indicating that the first response field is predicted to be related to security, designate the first response field for security policy creation.

10. The method of claim 9 further comprising supplying training data for ongoing learning of the text classifier, wherein supplying training data for ongoing learning comprises,
    based on creation of a first security policy that comprises the first response field, determining that the first response field is related to security based on the first security policy; and
    generating training data from the first response field based on labelling the first description of the first response field as related to security.

11. One or more non-transitory computer-readable media having program code stored thereon, the program code comprising instructions to:
    based on extraction of a description of a first response field corresponding to a first function of an application programming interface (API) from documentation of the API, determine whether the first response field is predicted to be informative to security, wherein the instructions to determine whether the first response field is predicted to be informative to security comprise instructions to,
        input the description of the first response field to a trained text classifier, wherein the trained text classifier was trained to predict whether response fields are informative to security based on their descriptions extracted from API documentation that were labelled as informative to or not informative to security; and
        evaluate an output of the trained text classifier to determine whether the first response field is predicted to be informative to security; and based on a determination that the first response field is predicted to be informative to security, designate the first response field for security policy creation.

12. The non-transitory computer-readable media of claim 11, wherein the trained text classifier comprises at least one of a trained Bidirectional Encoder Representations from Transformers (BERT) model, a trained model pipeline comprising a trained doc2vec model and a trained logistic regression classifier, and a trained model pipeline comprising a bag-of-words model and a classifier.

13. The non-transitory computer-readable media of claim 11, wherein the program code further comprises instructions to, based on creation of a security policy that indicates the first response field, supply training data generated based on the security policy for ongoing learning of the trained text classifier.

14. The non-transitory computer-readable media of claim 11, wherein the program code further comprises instructions to obtain the documentation of the API, wherein the documentation of the API comprises one or more new or unknown functions of the API, wherein the first response field corresponds to one of the one or more new or unknown functions.

15. An apparatus comprising:
a processor; and
a non-transitory computer-readable medium having instructions stored thereon that are executable by the processor to cause the apparatus to:
parse documentation of an API published by a vendor to generate parsed API documentation, wherein the parsed API documentation defines a format of a plurality of API responses for functions of an API of a vendor, wherein the plurality of API responses comprises corresponding ones of a plurality of response fields indicated in the documentation of the API;
determine a first subset of the plurality of response fields that are related to security and a second subset of the plurality of response fields that are not related to security based on a determination of which of the plurality of response fields are indicated in security policies enforced for resources of the vendor;
extract descriptions corresponding to the first and second subsets of response fields from the parsed API documentation;
label those of the descriptions corresponding to the first subset of response fields with labels indicating that the first subset of response fields is pertinent to resource security and those of the descriptions corresponding to the second subset of response fields with labels indicating that the second subset of response fields is not related to security; and
train a text classifier on the descriptions that have been labelled as related or not related to security, wherein the instructions to train the text classifier comprise instructions to train the text classifier to predict whether new or unknown response fields are related to security based on their corresponding descriptions.

16. The apparatus of claim 15, further comprising instructions executable by the processor to cause the apparatus to match each response field of the first and second subsets of response fields to their descriptions in the parsed API documentation based on names of response fields in the first and second subsets of response fields.

17. The apparatus of claim 15,
wherein the instructions executable by the processor to cause the apparatus to determine the first subset of response fields comprise instructions executable by the processor to cause the apparatus to determine that each of the first subset of response fields is represented in the security policies, and
wherein the instructions executable by the processor to cause the apparatus to determine the second subset of response fields comprise instructions to determine that each of the second subset of response fields is not represented in the security policies.

18. The apparatus of claim 15, further comprising instructions executable by the processor to cause the apparatus to:
based on training of the text classifier resulting in a trained text classifier, input a first description corresponding to a first response field into the trained text classifier, wherein the first description was not used as input for training the trained text classifier and the first response field is new or unknown; and
receive, from output of the trained text classifier, a prediction as to whether the first response field is pertinent to security; and
based on a determination that the first response field is predicted to be pertinent to security, designate the first response field for security policy creation.

19. The apparatus of claim 15, wherein the instructions to train the text classifier comprise instructions to train a Bidirectional Encoder Representations from Transformers (BERT) model.

20. The apparatus of claim 15, wherein the instructions to train the text classifier comprise instructions to train a machine learning model pipeline comprising a natural language processor and a classifier.

* * * * *